United States Patent
Van Nieuwenhuyze et al.

(10) Patent No.: US 9,894,469 B2
(45) Date of Patent: Feb. 13, 2018

(54) NFC DEVICE WITH MULTIPLE SECURE ELEMENTS

(71) Applicants: Proton World International N.V., Zaventem (BE); STMicroelectronics (Rousset) SAS, Rousset (FR)

(72) Inventors: Olivier Van Nieuwenhuyze, Wezembeek-Oppem (BE); Jean Marc Grimaud, Biot (FR); Arach Mohammed Brahim, Antibes (FR)

(73) Assignees: Proton World International N.V., Diegem (BE); STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/080,373

(22) Filed: Mar. 24, 2016

(65) Prior Publication Data

US 2017/0055109 A1 Feb. 23, 2017

(30) Foreign Application Priority Data

Aug. 17, 2015 (FR) ..................................... 15 57765

(51) Int. Cl.
*H04W 4/00* (2009.01)
*H04W 12/08* (2009.01)
(Continued)

(52) U.S. Cl.
CPC ........ *H04W 4/008* (2013.01); *G06K 7/10237* (2013.01); *H04W 12/02* (2013.01); *H04W 12/08* (2013.01); *H04W 40/02* (2013.01)

(58) Field of Classification Search
CPC ................................................ H04W 4/0008
(Continued)

(56) References Cited

U.S. PATENT DOCUMENTS

2007/0263596 A1* 11/2007 Charrat .................. H04L 45/54
370/351
2009/0191812 A1* 7/2009 Teruyama ............ G06K 7/0008
455/41.1
(Continued)

FOREIGN PATENT DOCUMENTS

EP 2 590 107 A1 5/2013
EP 2 600 639 A1 6/2013

OTHER PUBLICATIONS

French Search Report, dated May 31, 2016, for French Application No. 1557765, 2 pages.
(Continued)

*Primary Examiner* — Wen Huang
(74) *Attorney, Agent, or Firm* — Seed IP Law Group LLP

(57) ABSTRACT

An NFC device includes first and second secure elements, an NFC router, and a processor. A method involves emulating, by the NFC router in response to a command from the processing device, an RF card emulation transaction. The RF card emulation transaction includes transmitting by the NFC router a command to the first and second secure elements to verify the presence of NFC transaction applications in the first and second secure elements. The method also includes receiving, by the NFC router, responses from the first and second secure elements and a new RF message from an NFC terminal. The responses indicate the NFC transaction applications stored by the first and second secure elements, and the new RF message relates to an NFC transaction. The new RF message is routed to the first or second secure element based on the responses.

20 Claims, 3 Drawing Sheets

(51) Int. Cl.
*G06K 7/10* (2006.01)
*H04W 12/02* (2009.01)
*H04W 40/02* (2009.01)

(58) Field of Classification Search
USPC ..................................... 455/41.1, 41.2, 41.3
See application file for complete search history.

(56) References Cited

U.S. PATENT DOCUMENTS

| | | | | |
|---|---|---|---|---|
| 2009/0247077 | A1* | 10/2009 | Sklovsky | G06F 9/445 |
| | | | | 455/41.1 |
| 2010/0190437 | A1* | 7/2010 | Buhot | H04B 5/06 |
| | | | | 455/41.1 |
| 2010/0207742 | A1* | 8/2010 | Buhot | H04B 5/06 |
| | | | | 340/10.51 |
| 2011/0022482 | A1* | 1/2011 | Florek | G06Q 20/20 |
| | | | | 705/16 |
| 2011/0130095 | A1* | 6/2011 | Naniyat | G06K 7/0008 |
| | | | | 455/41.1 |
| 2012/0129450 | A1* | 5/2012 | Lee | H04M 1/7253 |
| | | | | 455/41.1 |
| 2012/0178366 | A1* | 7/2012 | Levy | G06K 7/10237 |
| | | | | 455/41.1 |
| 2013/0040566 | A1* | 2/2013 | Mourtel | G06K 7/0008 |
| | | | | 455/41.1 |
| 2013/0102246 | A1* | 4/2013 | Gagne | G06Q 20/3278 |
| | | | | 455/41.1 |
| 2013/0144793 | A1* | 6/2013 | Royston | H04W 4/001 |
| | | | | 705/72 |
| 2014/0364058 | A1* | 12/2014 | Chew | G06F 21/34 |
| | | | | 455/41.1 |
| 2015/0020160 | A1* | 1/2015 | Goncalves | G06Q 20/351 |
| | | | | 726/3 |
| 2015/0111495 | A1 | 4/2015 | Van Nieuwenhuyze | |

OTHER PUBLICATIONS

EMVCo, "EMV® Contactless Specifications for Payment Systems," *EMV Contactless Book B: Entry Point Specification Version 2.5*, Mar. 2015, 48 pages.

ETSI, "Smart Cards; UICC—Contactless Front-end (CLF) Interface; Host Controller Interface (HCI) (Release 12)," *ETSI Technical Specification 102 622 V12.1.0*, Oct. 2014, 64 pages.

ETSI, "Smart Cards; UICC—Contactless Front-end (CLF) Interface; Part 1: Physical and data link layer characteristics (Release 11)," *ETSI Technical Specification 102 613 V11.0.0*, Sep. 2012, 57 pages.

ISO/IEC, "Identification cards—Contactless integrated circuit(s) cards—Proximity cards—Part 3: Initialization and anticollision," *International Standard ISA/IEC 14443-3*, Feb. 1, 2001, 58 pages.

ISO/IEC, "Information technology—Telecommunications and information exchange between systems—Near Field Communication—Interface and Protocol (NFCIP-1)," *International Standard ISO/IEC 18092*, Mar. 15, 2013, 52 pages.

\* cited by examiner

| | PRE | SYNC | L | PAYLOAD | | | | | CRC |
|---|---|---|---|---|---|---|---|---|---|
| | 502 | 504 | 506 | INS | SC1 | SC2 | RC | TSN | 509 |
| | | | | 510 | 512 | 514 | 516 | 518 | |

508 spans PAYLOAD

218

| | TYPE OF ROUTING | AID/SC | TARGET | |
|---|---|---|---|---|
| ENTRY1 | AID | A0000000031010 | UICC | (VISA) |
| ENTRY2 | FELICA | 0002 | UICC | (FELICA APPLICATION) |
| ENTRY3 | AID | A0000000041010 | eSE | (MASTERCARD) |
| ENTRY4 | RF TYPE A | – | eSE | (MIFARE CLASSIC) |
| ENTRY5 | FELICA | 0003 | eSE | (FELICA APPLICATION) |

NFC DEVICE WITH MULTIPLE SECURE ELEMENTS

This application claims the priority benefit of French Patent application number 15/57765, filed on Aug. 17, 2015, the contents of which is hereby incorporated by reference in its entirety to the maximum extent allowable by law.

BACKGROUND

Technical Field

The present disclosure relates to the field of near field communication (NFC) communications, and in particular to an NFC device with multiple secure elements and to a method of routing messages in such a device.

Description of the Related Art

Mobile telephones and other types of mobile devices are increasingly being equipped with near field communication (NFC) interfaces, which enable them to perform electromagnetic transponder functions in addition to their other functions. In particular, such devices are able to emulate the functions of an electromagnetic transponder, which could be of the contactless card type, or the contactless reader type. Such functionality for example enhances the mobile device, by allowing it to be used for various applications, for example as an electronic wallet allowing payments to be made for accessing services such as transport networks.

To emulate the operation of a contactless card, the mobile device is generally equipped with a contactless front-end integrated circuit (CLF), also called an NFC router. This router is equipped with a radio frequency (RF) transceiver front-end coupled to a low-range antenna to match the communication capabilities of an electromagnetic transponder. In some applications, one or more secure elements (SE) or embedded secure elements (eSE), either integrated in the mobile device or contained in a micro-circuit of the USIM (universal subscriber identification module) or μSD (micro secure digital), can be used to provide authentication and other functions.

The NFC router comprises an NFC routing table, which indicates to which hardware the NFC messages received by the NFC router should be routed. For example, some NFC messages, such as those relating to certain types of electronic payment, are to be routed to a secure element of the mobile device. For instance, a VISA application may be running in communication with a Secure Element of a USIM (the name "VISA" may correspond to registered trademarks).

In some cases, the mobile device comprises more than one secure element, and there may be one or more applications stored by each secure element that is capable of handling a given transaction. In such a case, it is desirable that the mobile device is capable of selecting the application to be used among the available applications on all secure elements.

However, a difficulty is that the NFC router is not aware of the list of applications stored by each secure element. Furthermore, when an RF message is received and needs to be routed to a secure element, it is not permitted and nor is there time to interrogate all of the secure elements in order to obtain the lists of applications available on each secure element. There is thus a need in the art for a solution that addresses some or all of these difficulties.

BRIEF SUMMARY

It is an aim of embodiments of the present disclosure to at least partially address one or more needs in the prior art.

According to one aspect, there is provided a method comprising: emulating, by an NFC (near field communication) router of an NFC device in response to a command from a processing device of the NFC device, an RF (radio frequency) card emulation transaction, the emulation comprising transmitting, by the NFC router, a command to first and second secure elements of the NFC device to verify the presence of one or more NFC transaction applications in the first and second secure elements; receiving, by the NFC router, responses from the first and second secure elements indicating the one or more NFC transaction applications stored by the first and second secure elements; and receiving, by the NFC router, a new RF message from an NFC terminal relating to an NFC transaction and routing the new RF message to the first or second secure element based on the responses.

According to one embodiment, the method further comprises: generating a global list of available NFC transaction applications based on said responses; and supplying the global list to the NFC terminal in response to the new RF message.

According to one embodiment, the method further comprises, after generating the global list of available NFC transaction applications, storing the list in a memory of the NFC router.

According to one embodiment, the global list of available NFC transaction applications is generated by the processing device of the NFC device.

According to one embodiment, the one or more NFC transaction applications are payment applications, and where the command comprises a select PPSE (proximity payment system environment) command.

According to one embodiment, each of the one or more NFC transaction applications is associated with a system code value, and the command comprises a polling message including a system code value.

According to one embodiment, the method further comprises verifying the presence of one or more NFC transit applications on said first and second secure elements by accessing, by the NFC router or by the processing device, one or more bits of a SAK (Select Acknowledge, Type A) value of each secure element stored in a registry of the NFC router.

According to one embodiment, the method further comprises generating a routing table based on the responses, and storing the routing table in a memory of the NFC router.

According to one embodiment, the method further comprises, prior to routing the new RF message to the first or second secure element, selecting the first or second secure element to which the new RF message is to be routed based on the routing table.

According to one embodiment, the method further comprises, prior to routing the new RF message to the first or second secure element, responding to the new RF message by communicating identifiers of at least two of said transaction applications to the NFC terminal, and receiving from the NFC terminal a selection of one of the NFC transaction applications.

According to one embodiment, each of the first and second secure elements stores an NFC payment transaction application.

According to a further aspect, there is provided a transitory or non-transitory digital storage medium storing instructions that, when executed by a processing device, cause the above method to be implemented.

According to a further aspect, there is provided an NFC (near field communication) device comprising: an NFC router adapted to: emulate, in response to a command from a processing device of the NFC device, an RF (radio frequency) card emulation transaction, emulating the transaction comprising transmitting, by the NFC router, a command to first and second secure elements of the NFC device to verify the presence of one or more NFC transaction applications in the first and second secure elements; receive responses from the first and second secure elements indicating the one or more NFC transaction applications stored by the first and second secure elements, wherein a global list of available NFC transaction applications is generated based on said responses; and receive a new RF message from an NFC terminal relating to an NFC transaction and routing the new RF message to the first or second secure element based on the global list of available NFC transaction applications.

According to one embodiment, the processing device or the NFC router is adapted to generate a global list of available NFC transaction applications based on said responses, and to supply the global list to the NFC terminal in response to the new RF message.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The foregoing and other features and advantages will become apparent from the following detailed description of embodiments, given by way of illustration and not limitation with reference to the accompanying drawings, in which.

DETAILED DESCRIPTION

Figure 1:
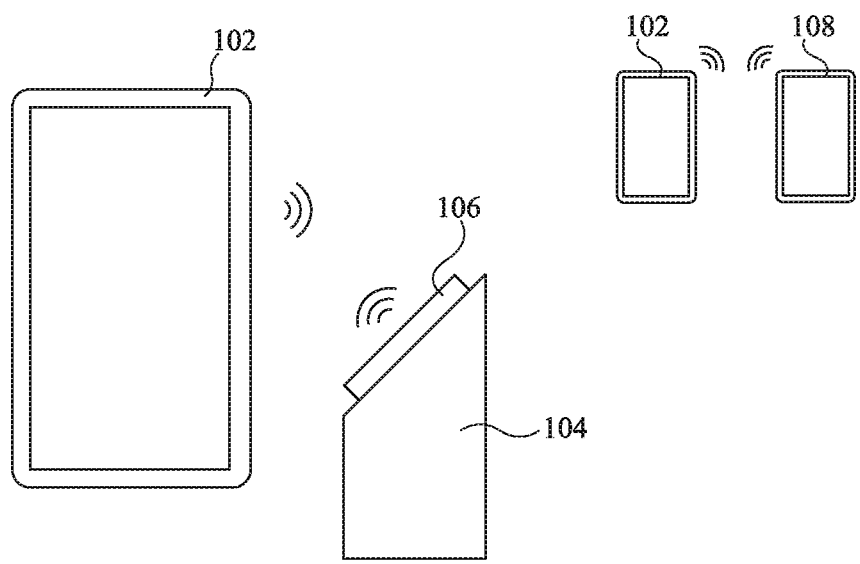
FIG. 1 schematically illustrates an NFC device capable of NFC communications according to an example embodiment of the present disclosure.

FIG. 1 schematically illustrates an NFC device 102, which is a device capable of NFC communications. For example, the device 102 is a mobile device, such as a mobile telephone, smart phone, tablet computer, digital media player or the like, equipped with NFC circuitry (not illustrated in FIG. 1).

On the left-hand side in FIG. 1, the NFC device 102 is shown in communication with a reader 104, comprising an NFC transponder 106. For example, the reader 104 is positioned at an entry barrier of a restricted area, such as a transport network or the like. Alternatively, the reader 104 is positioned at a point of sale in a shop or restaurant. When used with such a reader, the NFC circuitry of the NFC device 102 for example operates in a tag emulation mode.

On the right-hand side in FIG. 1, the NFC device 102 is shown in communication with another NFC device 108 via an NFC interface. For example, like NFC device 102, the NFC device 108 is a device capable of NFC communications, which could be a mobile device such as a mobile telephone, smart phone, tablet computer, digital media player or the like, equipped with NFC circuitry. When communicating with another NFC device, the NFC circuitry of the NFC device 102 for example operates in a peer-to-peer mode, and communications are initiated by either one of the NFC devices.

Figure 2:
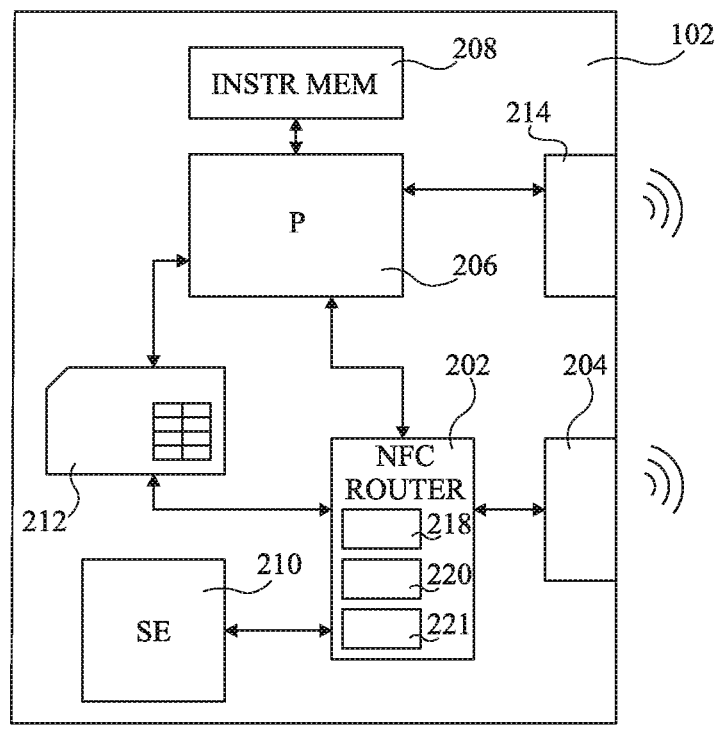
FIG. 2 schematically illustrates the NFC device of FIG. 1 in more detail according to an example embodiment of the present disclosure.

FIG. 2 schematically illustrates the NFC device 102 in more detail according to an example embodiment.

As illustrated, the device 102 for example comprises an NFC router (NFC ROUTER) 202, also known in the art as a contactless front-end (CLF). The NFC router 202 is coupled to an NFC antenna 204, and together the router 202 and antenna 204 provide NFC circuitry for emulating the behavior of an NFC transponder.

The NFC router 202 is also for example coupled to a host processing device (P) 206 of the NFC device 102. The device 206 for example comprises one or more processors under the control of instructions stored in an instruction memory (INSTR MEM) 208. The instruction memory 208 is for example a Flash memory, and stores one or more applications (not illustrated in FIG. 2) that have been loaded on the device. The NFC router 202 is also for example coupled to other devices, of which a secure element (SE) 210 and USIM (Universal Subscriber Identification Module) circuit 212 are illustrated. The secure element 210 is for example an embedded SE (eSE) coupled to the NFC router via an SWP (single wire protocol) link, and the USIM circuit 212 is for example a UICC (universal integrated circuit card) coupled to the NFC router via an SWP link, and is additionally coupled to the host processing device 206. While not illustrated in FIG. 2, there may be further secure elements such as one or more μSD.

The host processing device 206 is also for example coupled to one or more antennas 214, which permit telecommunications within a cellular network, and/or wireless communications according to other standards such as Wi-Fi, Bluetooth, etc.

The NFC router 202 for example comprises one or more memories storing an NFC routing table 218 and a PPSE (proximity payment system environment) list 220 of available NFC payment transaction applications stored by the secure elements 210, 212, as will be described in more detail below. The NFC routing table 218 defines rules for processing NFC messages received by the NFC router 202. In particular, the messages may be considered to be targeted to either the processing device 206 or to one of the secure elements 210, 212. The one or more memories of the NFC router 202 also for example store a registry 221 in which a SAK (Select Acknowledge, Type A) value is for example stored in association with each secure element, as will be described in more detail below.

In operation, the routing table 218 could be configured to route all payment related RF communications to a specific secure element, such as the element 210. In such a case, when the NFC device 102 comes within range of an NFC terminal, such as the terminal 104 of FIG. 1, the terminal transmits an RF polling message to the NFC device. The NFC router 202 for example detects, based on an identifier in the polling message, that the communication concerns a payment, and based on the NFC routing table 218, automatically routes the communication to an appropriate secure element, such as the element 210. The NFC terminal then transmits a Select PPSE select command to the secure element. A PPSE application of the secure element responds by providing a list of payment applications available on the secure element, with their application identifiers (AIDs). The payment applications are for example presented to the NFC terminal in an order of preference defined by the user. The NFC terminal then selects an appropriate payment application based on the capabilities of the NFC terminal. In the case that there is more than one payment application in the secure element 210 that is compatible with the NFC terminal, the NFC terminal for example selects the application having the highest priority. In particular, a user of the NFC device has for example indicated a priority among the payment applications before the transaction was executed. The priority is for example represented by the order of the transactions in the list returned by the PPSE application, the highest application in the list having the highest priority, and the lowest application in the list having the lowest priority.

The payment transaction will then be executed using the application hosted by the secure element that has the highest priority and that is supported by the NFC terminal. In one particular example, the application with the highest priority is a "domestic" payment application, linked for example to the device user's bank account, and a lower priority application is an "international" payment application, such as a VISA application. An NFC terminal in the home country of the user will thus for example support both the domestic and international applications, and the domestic application will be selected in view of its higher priority. An NFC terminal in another country does not support the domestic application, and thus the international application will be selected to execute the transaction.

The above procedure works well when there is a single secure element capable of handling a given type of transaction. However, in some cases there may be more than one secure element on the NFC device capable of doing so. For example, both the secure elements 210 and 212 may store applications capable of handling payments or other types of transactions, as will now be described with reference to FIG. 3.

Figure 3:
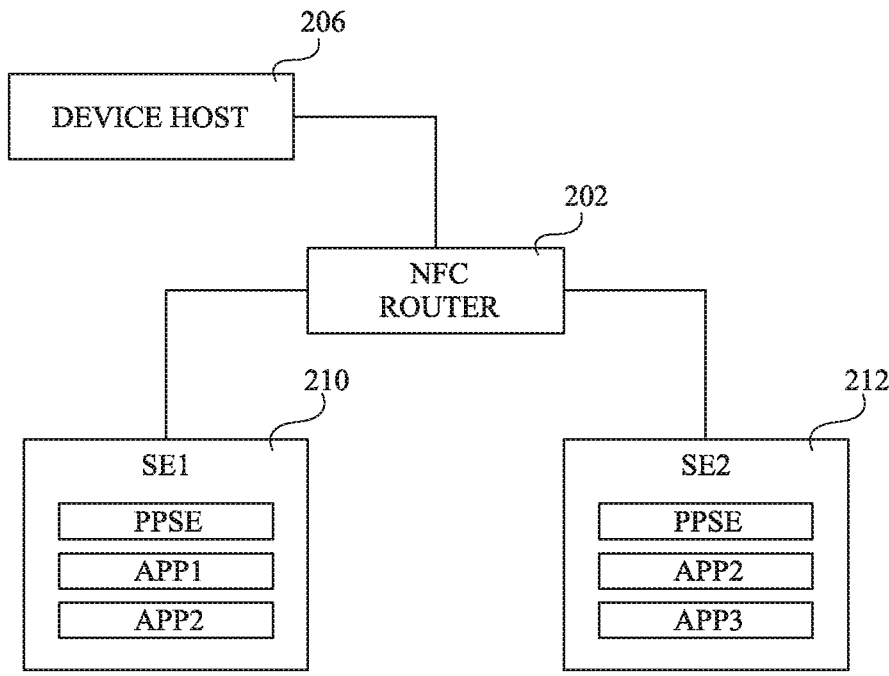
FIG. 3 schematically illustrates components of the NFC device of FIG. 2 in yet more detail according to an example embodiment of the present disclosure.

FIG. 3 schematically illustrates components of the NFC device of FIG. 2 in more detail according to an example embodiment. In particular, FIG. 3 illustrates the NFC router (NFC ROUTER) 202, the device host (DEVICE HOST) 206, and the secure elements (SE1) 210 and (SE2) 212. Both of the secure elements 210, 212 for example store a PPSE (proximity payment system environment) application. Furthermore, the secure element 210 for example stores NFC transaction applications APP1 and APP2, and the secure element 212 for example stores NFC transaction applications APP2 and APP3. The term "NFC transaction application" is used herein to designate an application that is executed on a secure element and enables a transaction to take place via the NFC interface, such as a secure payment transaction, or other form of financial or private transaction.

The applications APP1 and APP3 are for example payment applications, APP1 for example being a VISA application, and APP3 for example being a MASTERCARD application (the name "MASTERCARD" may correspond to a registered trademark).

The applications APP2 in both secure elements are for example the same. However, they are for example configured for different payments accounts/circumstances. For example, both of the APP2 applications are transit payment applications, such as MIFARE CLASSIC 1K applications (the name MIFARE may correspond to a registered trademark). However, these applications may be configured for use on different transport networks, and/or in different countries.

Based on an RF polling message from an NFC terminal relating to a payment or transit transaction, the NFC router 202 is not able to determine which of the secure elements is to be used for implementing the transaction.

Figure 4:
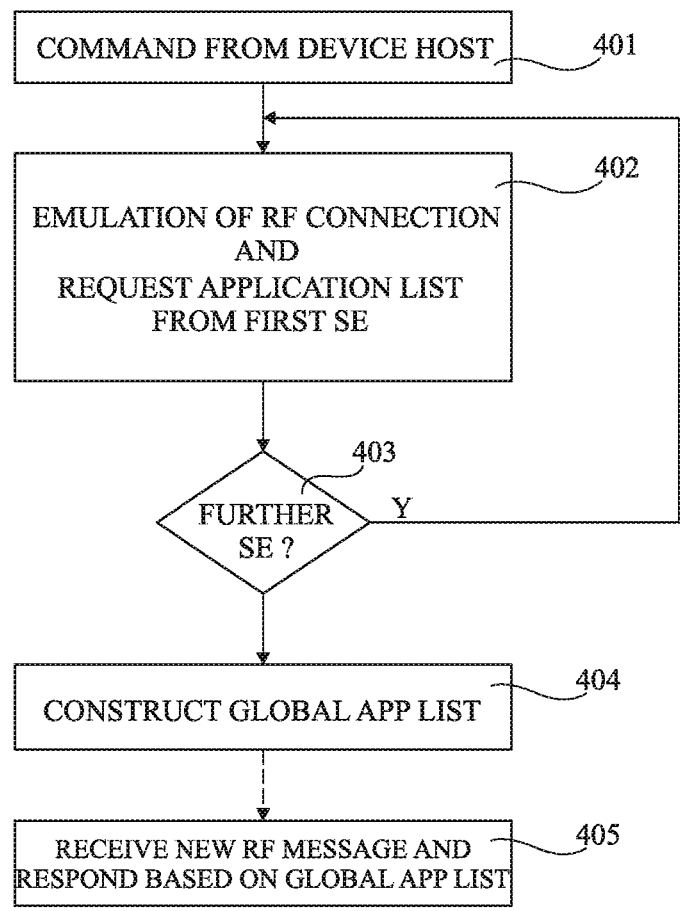
FIG. 4 is a flow diagram illustrating an example of operations in a method of routing RF messages according to an example embodiment of the present disclosure.

FIG. 4 is a flow diagram of a method of routing an RF message according to an example embodiment. The method for example comprises operations 401 to 404 for generating a global list of available NFC applications, and an operation 405 in which the list of available applications is supplied to an NFC terminal in response to a new RF message. The data for forming the global list of available NFC transaction applications is for example collected by the NFC router 202 in response to a command from the device host 206, and incorporates data retrieved from each secure element, and optionally from other sources.

In an operation 401, a command is transmitted, from the host device 206 to the NFC router 202, to generate a global list of available NFC transaction applications. This command is for example generated periodically, for example every hour, such that the list of available applications is always relatively up to date. In some embodiments, a command is generated in response to the detection by the host device of a new application identifier AID being stored by the host device to reflect a change in the applications, such as the addition of a new application.

In an operation 402, the NFC router 202 for example obtains details of payment applications on a first secure element of the NFC device by performing an emulation of an RF card emulation session. For example, the first element is the element 210. The emulation is for example a host controller interface (HCI) card emulation, and involves requesting an application list from the first secure element. For example, emulation is based on communication according to type A or type B defined by the NFC standard ISO/IEC 14443. This step for example involves emulating an RF Card Emulation transaction by sending an HCI command, as defined in the specification ETSI TS 102 622. For example, a version V12.1.0 of this ETSI (European Telecommunications Standards Institute) specification is available on the website http://www.etsi.org, the contents of which is hereby incorporated by reference to the extent permitted by the law. In particular, the emulation of an RF Card Emulation transaction for example comprises activating, by the NFC router 202, a communications link between the NFC router 202 and the first secure element, if this link is deactivated. The communication link between the NFC router 202 and each secure element is for example an SWP (single wire protocol) link.

The NFC router 202 then for example requests, from the first secure element of the NFC device, a list of payment applications that are stored by it and available for handling NFC transactions. For example, this request is in the form of a "SELECT PPSE" command transmitted by the NFC router 202 to the first secure element of the NFC device. Making a SELECT PPSE command for example involves first sending an EVT_CARD_ACTIVATION event message based on card emulation of RF type A or B, depending on the secure element configuration. This event is defined by the ETSI TS 102.622 specification. The message is for example based on a HCP (Host Controller Protocol) message structure having the following format:

Header: 1 byte (bits b1 to b8)
type: b8, b7
instruction: b6 to b1
Data: unlimited size (but for example split into packets for transmission over the SWP according to the specification ETSI TS 102 613).

For example, the eight bits of the EVT_SEND_DATA are 0x50.

Like for a true RF transaction, the command for example encapsulates an ISO7816 Select PPSE application request called EVT_SEND_DATA, as defined by the ETSI TS 102 622 specification. The following provides a specific example of the hexadecimal values forming an ISO-Select command to be included in an EVT_SEND_DATA command for selecting the PPSE (CRC value removed):

"00 a4 04 00 0e 32 50 41 59 2e 53 59 53 2e 44 44 46 30 31 00"

An application stored by the first secure element, which is for example a PPSE application, for example responds to the Select PPSE request by providing a list of all of the available NFC payment transaction applications stored by the secure element. The response is for example an APDU (Application Protocol Data Unit) response, which is for example also encapsulated in an EVT_SEND_DATA HCI command. As a specific example in which an INTERAC payment application is present on the secure element (the name "INTERAC" may correspond to one or more registered trademarks), the response to the above select PPSE command is for example the following message, presented in hexadecimal values, based on an example in which there is a single payment application: "6F 2C 84 0E 32 50 41 59 2E 53 59 53 2E 44 44 46 30 31 A5 1A BF 0C 17 61 15 4F 07 A0 00 00 02 77 10 10 87 01 01 50 07 49 4E 54 45 52 41 43". This response can be parsed as follows:

```
PICC  Successful
     Data (46 bytes)
          Tag 6F: FCI Template
          Length: 2C
              Tag 84: Dedicated File (DF) Name
              Length: 0E
              Value : 32 50 41 59 2E 53 59 53 2E 44 44 46 30 31
              Tag A5: FCI Proprietary Template (first app)
              Length: 1A
                  Tag BF0C: FCI Discretionary Data
                  Length: 17
                      Tag 61: Application Template
                      Length: 15
                          Tag 4F:Application Identifier
                          Length:07
                          Value :A0 00 00 02 77 10 10
                          Tag 87:Application Priority Indicator
                          Length:01
                          Value :01
                          Tag 50:Application Label
                          Length:07
                          Value :49 4E 54 45 52 41 43
                          ASCII Value:INTERAC
              Tag A5: FCI Proprietary Template (second app)
              ........etc.
              SW1 SW2: 90 00
``` where PICC stands for proximity integrated circuit card. As illustrated in this example, the Tag A5 portion is for example repeated for each application that it present on the secure element. It will be understood by those skilled in the art that one or more of the fields of this response may be optional and that one or more additional fields may be present, depending on the application. The response for example indicates at least the application identifier AID of each payment transaction application that is present. The format of the command and how it should be parsed is for example described in more detail in the EMVCo specification, and in particular EMV Contactless, Book B (version 2.5), table 3-2, the entire contents of this specification being hereby incorporated by reference to the extent permitted by the law.

The use of the Select PPSE command as described above allows the PPSE application stored on the secure elements to provide information relating to payment applications. In some embodiments, the NFC router 202 or host device 206 is also adapted to obtain information regarding other types of applications stored by the secure elements.

For example, for transit applications such as MIFARE CLASSIC, the NFC router or host device for example reads part of a SAK (Select Acknowledge, Type A) value that the secure element stores in a registry of the NFC router 202. In particular, one bit of the SAK value for example indicates when a MIFARE CLASSIC application, or similar application according to ISO/IEC 14443 part 3, is present on the secure element.

For applications such as FELICA applications associated with a system code, type F card emulation is for example used with certain system codes to verify whether certain applications are present on a secure element. In particular, the NFC router for example transmits a polling request to the secure element containing a system code, and receives a response indicating whether or not an application associated with this system code is present on the secure element. This operation is for example repeated until one or more hits occur allowing one or more FELICA applications, or similar applications comprising a SAK, to be identified.

Figures 5, 6:
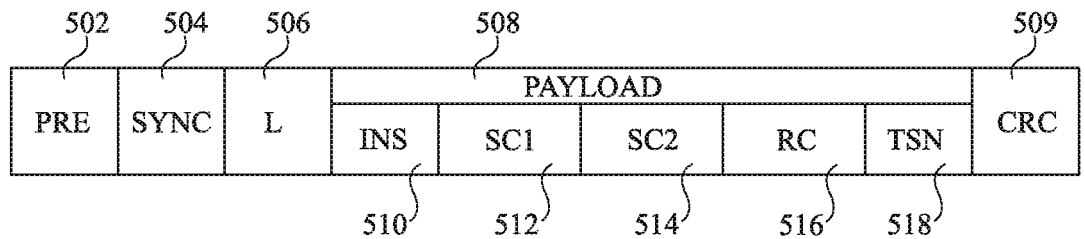
FIG. 5 illustrates an example of a data packet of a type F NFC message according to an example embodiment.
FIG. 6 illustrates an NFC routing table according to an example embodiment.

FIG. 5 illustrates an example of the format of a type F polling message according to the NFC standard ISO/IEC 18092. As illustrated, the data packet for example comprises a preamble (PRE) 502, which is for example 38 bits or more in length, a synchronization field (SYNC) 504, which is for example 6 bits in length, a length field (L) 506, which is for example 8 bits and indicates the total length of frame, a payload (PAYLOAD) 508, and a cyclic redundancy code field (CRC) 509. The payload 508 for example includes sub-fields comprising an instruction code (INS) 510, and one or more data fields. FIG. 5 illustrates the case of a polling message, in which the data fields comprise two system code fields (SC1, SC2) 512 and 514, which are for selecting a specific application, a request code field (RC) 516 used to request additional information, and a time slot number TSN 518 used for anti-collision purposes in the case there are several cards present in the field.

In the case of a polling message, the values of the PRE and SYNC fields are not for example taken into account as they are used to detect the start of frame and the speed transmission. The other fields for example have the following hexadecimal values: 06 00 FF FF 00 00 09 21, where the instruction code INS 510 is for example equal to 0x00, and the fields 512 and 514 are by default each at the value 0xFF, corresponding to wild card values, meaning that all other values are accepted (the prefix "0x" is used herein to indicate that the characters correspond to a hexadecimal values). Another example of the system code field SC1, SC2 is 0x00 0x02.

Referring again to FIG. 4, in a subsequent operation 403, it is determined whether or not there are further secure elements to be accessed. In the example of FIG. 3, there are two secure elements 210, 212, and thus after the secure element 210 has been accessed, there will be one remaining further secure element 212.

If there is a further secure element not yet accessed, the method for example returns to operation 402, and this operation is repeated for the further secure element.

Once all of the secure elements have been accessed, the next operation is 404, in which a global NFC transaction application list 220 is for example constructed by the NFC router 202, based on the lists of applications provided by each secure element. For example, the global list 220 of applications corresponds to a global PPSE application list, which lists the NFC payment applications present on the secure elements. Such a list for example has the same format as the PPSE response from each secure element (see the example of the APDU response provided above), but lists the applications stored by each of the secure elements of the NFC device. This list is then for example stored in a memory of the NFC router.

Rather than being generated by the NFC router 202, in some embodiments the global application list 220 could be generated by the device host 206, if for example the NFC router 202 forwards the application lists provided by the secure elements to the device host 206. Furthermore, rather than being stored by the NFC router, the list 220 could be stored by a memory of the device host 206.

The NFC router 202 or the device host 206 also for example generates or modifies the NFC routing table 218, based on the identified applications stored by each secure element.

FIG. 6 is a table illustrating an example of the NFC routing table 218.

In the example of FIG. 6, the routing table 218 has five entries. A first entry ENTRY1 for example corresponds to a VISA payment application having an application identifier in hexadecimal of "A0000000031010", and located in the UICC 212, the UICC 212 thus being the target for messages directed to this application. The second entry ENTRY2 for example corresponds to a FELICA application having a system code in hexadecimal of "0002", and located in the UICC 212, the UICC 212 thus being the target for messages directed to this application. The third entry ENTRY3 for example corresponds to a MASTERCARD application having an application identifier in hexadecimal of "A0000000041010", and located in the eSE 210, the eSE 210 thus being the target for messages directed to this application. The fourth entry ENTRY4 for example corresponds to a MIFARE CLASSIC application, which uses RF type A routing, is not associated with any AID or system code, and is located in the eSE 210, the eSE 210 thus being the target for messages directed to this application. The fifth entry ENTRY5 for example corresponds to a FELICA application having a system code in hexadecimal of "0003", and being located in the eSE 210, the eSE 210 thus being the target for messages directed to this application.

When generating the routing table 218 and the global list 220 of NFC transaction applications, a verification is for example performed to avoid conflicts among the applications. For example, if there is more than one payment application identified having the same application identifier AID, a selection is made so that only one of these applications appears in the list of applications 220, and in the routing table 218. For example, the user of the NFC device is prompted by the device host 206 to make this selection. Furthermore, if more than one transit application is identified stored on the secure elements, again a selection is for example made among the applications, for example by prompting the user to make this selection.

With reference again to FIG. 4, in operation 405, which may occur any time after the global NFC application list has been constructed in operation 404, a new RF message is received from an NFC terminal, and routed based on the constructed global NFC transaction application list 220 and/or based on the routing table 218.

For example, if the list 220 only includes a single NFC transaction application capable of handing the given RF transaction, the NFC router 202 for example routes the RF message directly to the secure element on which the NFC transaction application is stored.

Alternatively, if the list 220 includes more than one NFC transaction application capable of handling the RF transaction, then the NFC router 202 for example responds to the NFC terminal with a message including the NFC identifiers of the available transaction applications that can handle the NFC transaction. For example, the NFC terminal transmits a SELECT PPSE command to the NFC router, and the NFC router responds directly to the NFC terminal by transmitting a list of NFC payment applications available in the secure elements. If there is only one NFC transaction application that is compatible with the NFC terminal, the NFC terminal for example selects this NFC transaction application. Alternatively, if there is more than one transaction application that is compatible with the NFC terminal, then the NFC terminal for example selects the application having the highest priority, which is for example the application highest on the PPSE list. The NFC router 202 then for example sends a new RF message to the selected transaction application, which is routed by the NFC router 202 to the secure element storing the NFC transaction application.

Rather than the global list 220 of transaction applications being stored by the NFC router 202, as mentioned above, in some embodiments this list could be stored by a memory of the host device 206. In this case, the routing table 218 of the NFC router 202 is for example configured to route SELECT PPSE requests received from NFC terminals to the host device 206, such that the host device 206 may respond to such requests by providing the list 220 of payment applications stored by the secure elements.

An advantage of the embodiments described herein is that a selection between more than one NFC transaction application stored by different secure elements can be made when a new NFC message is received. This is achieved by constructing a global list of available NFC transaction applications in a secure manner by emulating, in response to a command from the host device, an RF card emulation transaction.

Having thus described at least one illustrative embodiment, various alterations, modifications and improvements will readily occur to those skilled in the art.

For example, while examples in which the transaction applications stored by the secure elements are payment applications, it will be apparent to those skilled in the art that the applications could be for performing other types of transactions.

Furthermore, it will be apparent to those skilled in the art that the various features described in relation with the various embodiments may be combined, in alternative embodiments, in any combination.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method, comprising:
providing a near field communication (NFC) device having an NFC router, a processing device, a first secure element, and a second secure element;

in response to a command from the processing device, emulating by the NFC router a radio frequency (RF) card emulation transaction, the emulating including:
  transmitting, by the NFC router, a command to the first and second secure elements to verify whether or not one or more NFC transaction applications are stored in the first and second secure elements;
  receiving, by the NFC router, responses from the first and second secure elements indicating the one or more NFC transaction applications stored by the first and second secure elements;
  based on the responses from the first and second secure elements, generating a global list of available NFC transaction applications;
  storing the global list in a memory of the processing device; and
  when two or more NFC transaction applications share a common identifier, accepting user input to prioritize an order in which the two or more NFC transaction applications sharing the common identifier will be selected;
receiving, by the NFC router, a new RF message from an NFC terminal, the new RF message relating to an NFC transaction;
routing the new RF message to the processing device;
analyzing the global list with the processing device;
based on the analyzing by the processing device, routing the new RF message to the first or second secure element based on the responses from the first and second secure elements and when the new RF message identifies the common identifier, routing the new RF message further based on the prioritized order; and
re-generating the global list of available NFC transaction applications based on at least one updated condition of the NFC device.

2. The method of claim 1, further comprising:
supplying the global list to the NFC terminal in response to the new RF message.

3. The method of claim 2, further comprising:
after generating the global list of available NFC transaction applications, storing the global list in a memory of the NFC router.

4. The method of claim 2, wherein the global list of available NFC transaction applications is generated by the processing device.

5. The method of claim 1, wherein the one or more NFC transaction applications are payment applications, and wherein the command to the first and second secure elements includes a select proximity payment system environment (PPSE) command.

6. The method of claim 1, wherein each of the one or more NFC transaction applications is associated with a system code value, and wherein the command to the first and second secure elements includes a polling message including a selected system code value.

7. The method of claim 1, further comprising:
accessing, by the NFC router or by the processing device, one or more bits of a Select Acknowledge, Type A (SAK) value of each secure element, the one or more bits of the SAK value stored in a registry of the NFC router, the accessing performed to verify whether or not the one or more NFC transit applications are stored in the first and second secure elements.

8. The method of claim 1, further comprising:
generating a routing table based on said responses from the first and second secure elements; and
storing the routing table in a memory of said NFC router.

9. The method of claim 8, further comprising:
prior to routing the new RF message to the first or second secure element, selecting the first or second secure element to which the new RF message is to be routed based on the routing table.

10. The method of claim 1, further comprising
prior to routing the new RF message to the first or second secure element, responding to the new RF message by communicating identifiers of at least two NFC transaction applications to the NFC terminal; and
in response to communicating the identifiers of the at least two NFC transaction applications, receiving from the NFC terminal a selection of one of the at least two NFC transaction applications.

11. The method of claim 1, wherein each of the first and second secure elements stores an NFC payment transaction application.

12. A non-transitory digital storage medium storing instructions that, when executed by a processing device of a near field communication (NFC) device, perform a method, the method comprising:
in response to a command from the processing device, emulating by an NFC router of the NFC device a radio frequency (RF) card emulation transaction, the emulating including:
  verifying whether or not any first NFC transaction applications are stored in a first secure element based on information received from the first secure element in response to at least one first command communicated from the NFC router;
  verifying whether or not any second NFC transaction applications are stored in a second secure element based on information received from the second secure element in response to at least one second command communicated from the NFC router;
  based on the information received from the first secure element and based on the information received from the second secure elements, generating a global list of available NFC transaction applications;
  storing the global list in a memory of the processing device; and
  when two or more NFC transaction applications share a common identifier, accepting user input to prioritize an order in which the two or more NFC transaction applications sharing the common identifier will be selected;
receiving, by the NFC router, a new RF message from an NFC terminal, the new RF message relating to an NFC transaction;
routing the new RF message to the processing device;
analyzing the global list with the processing device;
based on the analyzing by the processing device, routing the new RF message to one of the first secure element and the second secure element based on information in the global list, and when the new RF message identifies the common identifier, routing the new RF message further based on the prioritized order; and
based on at least one updated condition of the NFC device, regenerating the global list of available NFC transaction applications.

13. The non-transitory digital storage medium of claim 12, wherein the method further comprises:
supplying the global list of available NFC transaction applications to an NFC terminal in response to the new RF message.

14. The non-transitory digital storage medium of claim 12, wherein at least one first NFC transaction application and at least one second NFC transaction are payment applications, wherein the at least one first command includes a first select proximity payment system environment (PPSE) command, and wherein the at least one second command includes a second PPSE command.

15. The non-transitory digital storage medium of claim 12, wherein the method further comprises:
accessing, by the NFC router or by the processing device, one or more bits of a Select Acknowledge, Type A (SAK) value of each secure element, the one or more bits of the SAK value stored in a registry of the NFC router, the accessing performed to verify whether or not any NFC transit applications are stored in the first and second secure elements.

16. The non-transitory digital storage medium of claim 12, wherein the method further comprises:
generating a routing table based on the information received from the first secure element and the information received from the second first secure element;
storing the routing table in a memory of the NFC router; and
prior to routing the new RF message to the first secure element or the second secure element, selecting one of the first secure element and the second secure element to which the new RF message is to be routed based on the routing table.

17. A near field communication (NFC) device comprising:
a processing device;
a non-volatile memory coupled to the processing device, a first secure element;
a second secure element, and an NFC router, the NFC router and the processing device in cooperation arranged to:
emulate, in response to a command from the processing device, a radio frequency (RF) card emulation transaction, wherein emulating the RF card emulation transaction includes transmitting, by the NFC router, a command to the first and second secure elements to determine whether any NFC transaction applications in the first and second secure elements are available;
receive responses from the first and second secure elements indicating NFC transaction applications that are available in the first and second secure elements, wherein a global list of available NFC transaction applications is generated by the processing device and stored by the processing device in the non-volatile memory based on said responses;
when two or more NFC transaction applications share a common identifier, accepting user input to prioritize an order in which the two or more NFC transaction applications sharing the common identifier will be selected;
receive a new RF message from an NFC terminal relating to an NFC transaction;
analyze the new RF message with the processing device in accordance with the global list;
based on the analysis by the processing device, route the new RF message to the first secure element or the second secure element based on the global list of available NFC transaction applications and when the new RF message identifies the common identifier, routing the new RF message further based on the prioritized order; and
based on at least one updated condition of the NFC device, regenerating by the processing device the global list of available NFC transaction applications.

18. The NFC device of claim 17, wherein the global list of available NFC transaction applications is generated by the processing device or the NFC router and supplied to the NFC terminal in response to the new RF message.

19. The NFC device of claim 18, wherein each of the first and second secure elements stores at least one payment application available as an NFC transaction application.

20. The NFC device of claim 17, wherein each NFC transaction application is associated with a system code value, and wherein polling message commands to the first and second secure elements include a selected system code value.

* * * * *